United States Patent Office 3,161,881
Patented Dec. 15, 1964

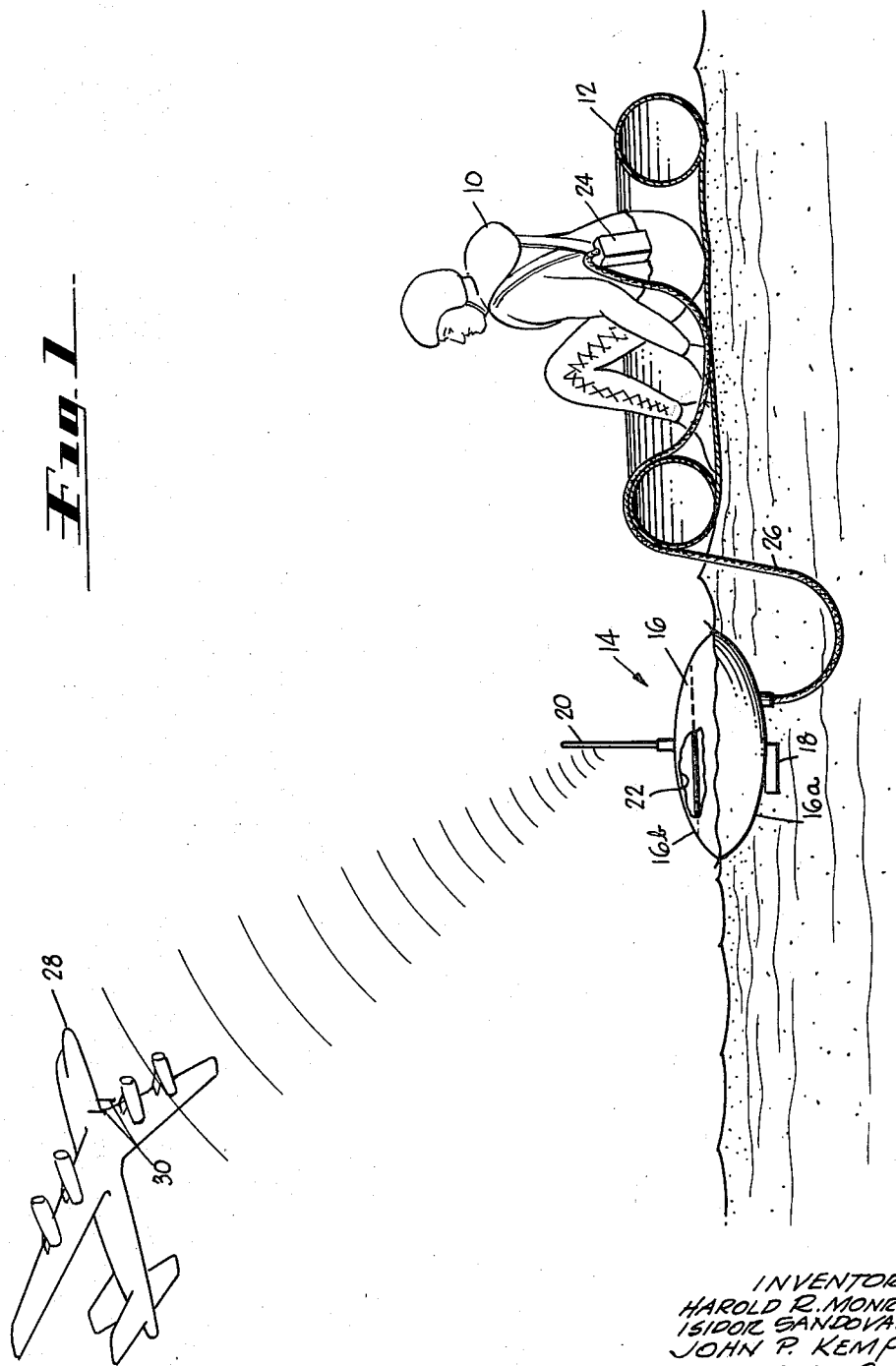

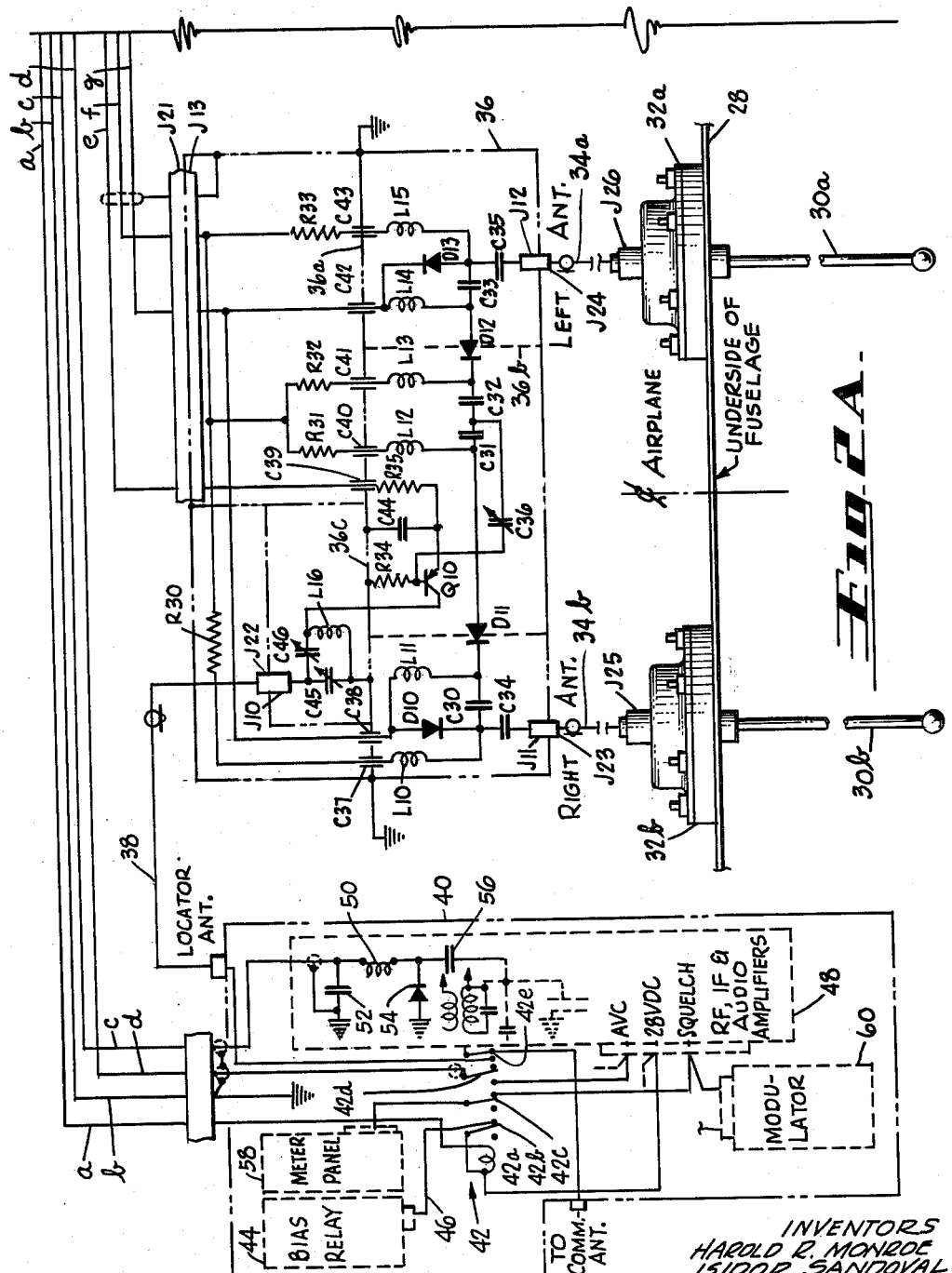

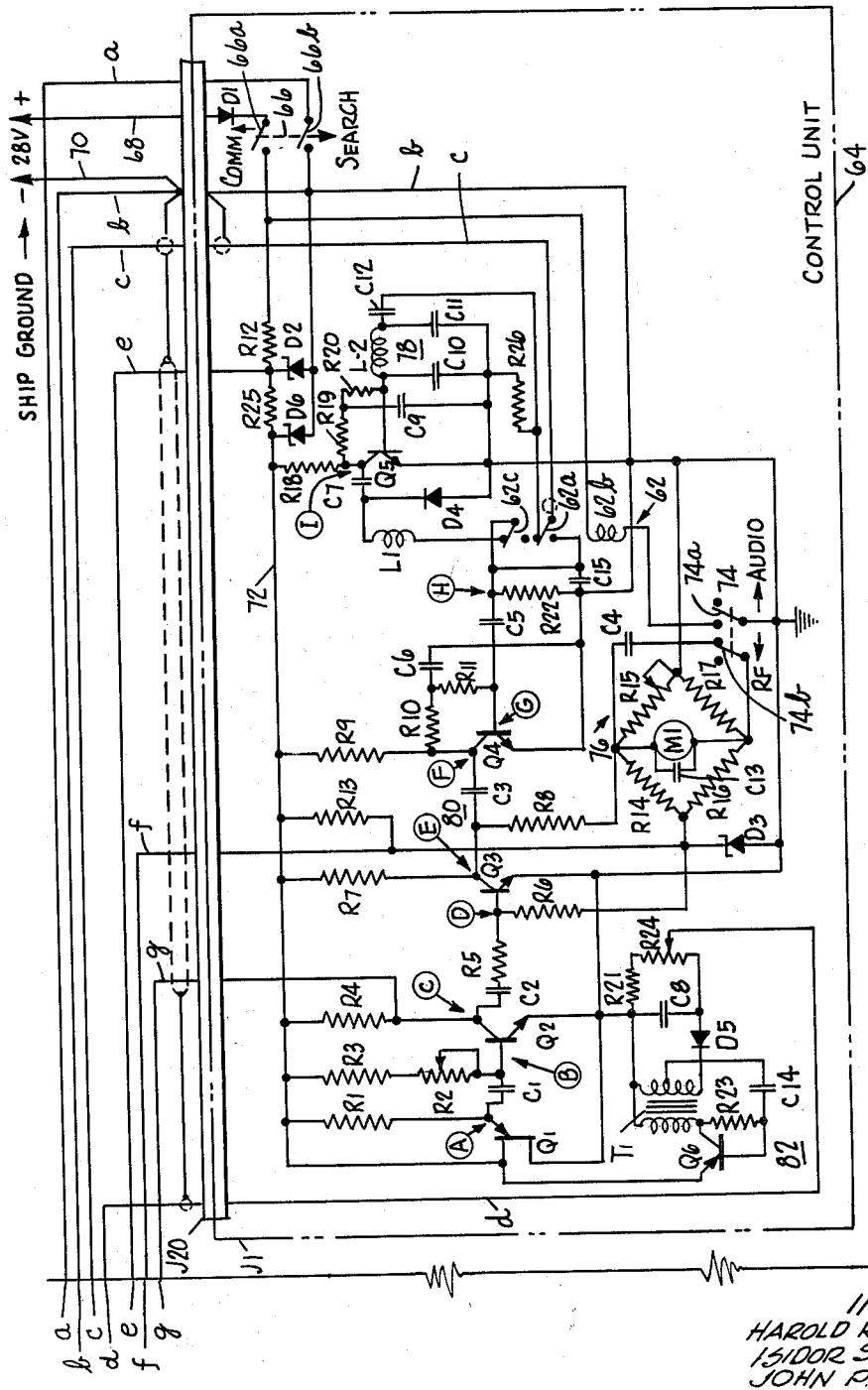

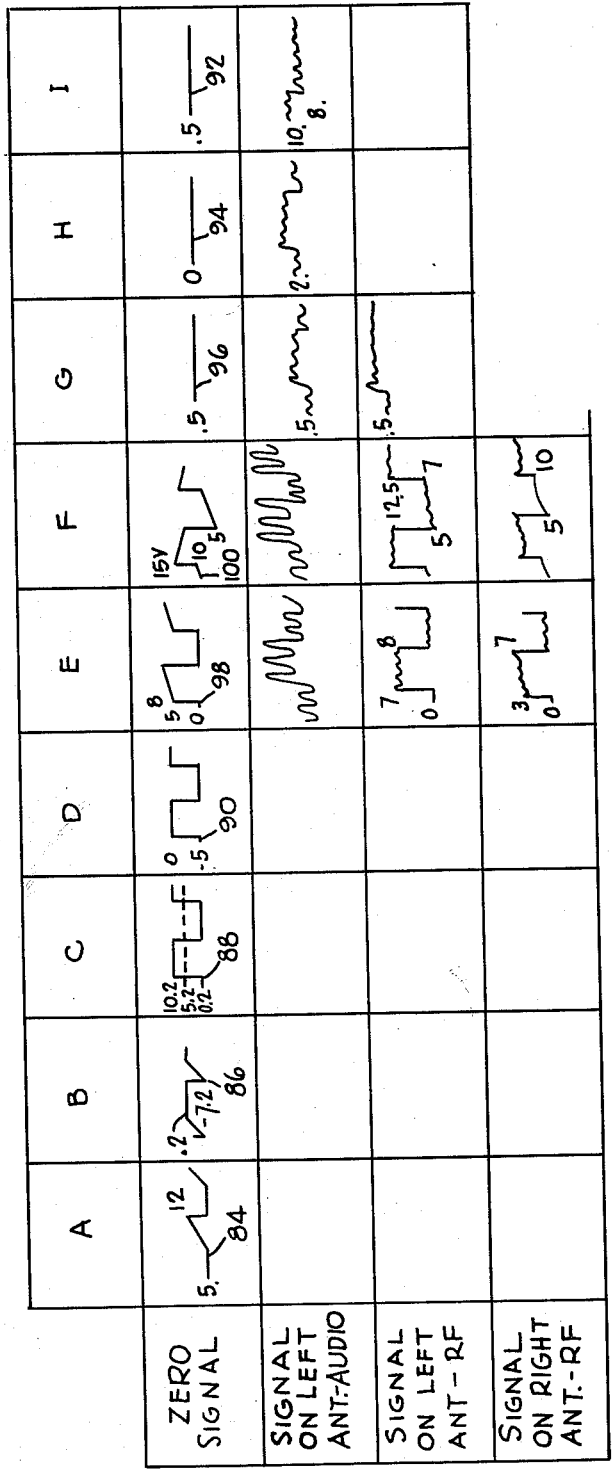

3,161,881
BEACON LOCATOR SYSTEM
Harold R. Monroe, Santa Monica, and Isidor Sandoval and John P. Kemp, Los Angeles, Calif., assignors to Douglas Aircraft Company, Inc., Santa Monica, Calif.
Filed Sept. 7, 1962, Ser. No. 222,005
15 Claims. (Cl. 343—120)

This invention relates generally to beacon locator systems and more particularly to a means for continuously indicating correct orientation of a search craft accurately towards a remotely located radio beacon which is producing and radiating a distinctively varying tone modulated carrier signal.

Radio beacons are usually provided for life rafts that are carried on board transoceanic aircraft so that in the event of an emergency wherein the aircraft is lost, survivors in the life rafts will have means for generating and radiating a signal on which search craft can use to home on. More recently, much smaller beacons have been produced which are sufficiently small and lightweight that it is possible for a pilot, for example, of a small aircraft to normally wear a life vest which is adapted to mount a small beacon and its accessories in pockets with little inconvenience to the pilot.

The output signal strength of one of these smaller beacons is, of course, less than that of one of the larger beacons. However, the radiated signal from one of the smaller beacons is usually strong enough to be effective over maximum ranges of normally anywhere from 150 to 200 miles according to the sensitivity of the radio receiver and system used. Since line-of-sight frequencies are used, greater ranges are of little advantage for the normal flight altitudes of the average aircraft. Nonetheless, the distances involved even with maximum ranges of about 150 to 200 miles are considerable when searching for a person who may be almost invisible bobbing in the ocean with the waves.

It is an object of this invention to provide an improved beacon locator system which is capable of correctly and accurately locating a beacon that is situated at a relatively great distance and radiating a comparatively weak signal.

Another object of the invention is to provide a beacon locator system which is selectively operable with a tone modulated carrier signal radiated from a remotely located beacon to achieve increased range in one selected condition and greater homing accuracy in another.

A further object of this invention is to provide a beacon locator system which can be readily adapted to be mounted on a search craft, for continuously guiding the craft to a remotely located beacon.

A still further object of the invention is to provide, in a beacon locator system including a pair of antenna elements, means for alternately sampling the received signal of one element while effectively grounding the other.

Briefly, and in general terms, the foregoing and other ancillary objects are preferably accomplished by providing a beacon locator system comprising a pair of antenna elements, an antenna switch for alternately sampling the antenna elements, a receiver which is alternately fed the antenna signals by the switch, and a control unit receiving the output of the receiver for producing an indication of the relative signal strengths received by the antenna elements.

The antenna switch includes an arrangement of circuit elements effectively forming a double pole, double throw switch for sampling one antenna element while grounding the other. The antenna switch is synchronously operated in response to the output of a signal generator in the control unit. The control unit also includes an oscillator circuit, a bandpass filter, a comparator and an indicator unit. The oscillator circuit is used to provide a negative control voltage for controlling the sensitivity of the receiver, and the filter can be selectively used to pass only the audio, varying tone modulation of the carrier to the comparator. The comparator utilizes the synchronizing signal from the generator in comparing the signal strengths on the antenna elements, and provides an output signal to the indicator unit to control its indication according to the differences in signal strengths on the antenna elements. By properly mounting the antenna elements on a search craft, and installing the remainder of the locator system on board, the craft can be directed continuously toward a beacon by simply following the indications of the indicator unit.

A detailed description of an illustrative example of the invention is given below, and other objects and advantages thereof will become apparent from such description taken in conjunction with the attached drawings, in which:

FIGURE 1 is a perspective view depicting a use of the beacon locator system in locating and rescuing the pilot of a downed aircraft;

FIGURES 2A and 2B, together, show a circuit diagram of one embodiment of the beacon locator system; and FIGURE 3 is a chart showing various exemplary waveforms which appear at certain points of the circuit illustrated in FIGURE 2B.

FIGURE 1 is a perspective view depicting a use of the showing the beacon locator system in use for locating and rescuing the pilot of a downed aircraft, for example. The pilot 10 has disengaged himself from his parachute harness and seated himself in an inflated rubber life raft 12. A balloon antenna 14 includes a float 16 which has been automatically inflated by inflator mechanism 18 attached to the normally lower skin 16a of the float 16 and has a whip antenna 20 centrally mounted to extend substantially vertically above the normally upper skin 16b of the float 16. The inflator mechanism 18 attached to the lower skin 16a keeps the float 16 bottom heavy so that it will be normally positioned with antenna 20 extending upwardly, after inflation of the float 16, whether on land or in a body of water as illustrated in FIGURE 1.

The upper skin 16b of the float 16 is broken away to show an inner layer 22 of silvered nylon cloth, for example, which is 12 by 12 inches in size to provide a ground plane for the antenna 20 that extends approximately 12.5 inches above it. The ground plane effect of the layer 22 insures an omnidirectional radiation pattern which provides a broader area of signal coverage. A beacon transmitter 24 is carried by the pilot 10 and is connected to the float 16 and its antenna 20 by a cable 26 of suitable length. The float 16 is, for example, 13.5 inches in diameter and is normally inflatable to a balloon thickness of approximately 7 inches.

The transmitter 24 operates on, for example, 243 mc.p.s. and can broadcast a tone modulated signal for 24 hours using suitable batteries. The carrier is distinctively modulated at a varying tone frequency and is radiated by the antenna 20 to be received by a search craft such as airplane 28. The airplane 28 preferably mounts a pair of whip antennas 30 on the underside of the aircraft, separated a quarter wavelength apart on a line perpendicular to the longitudinal axis of the aircraft. The airplane 28 carries on board a standard transmitting and receiving unit such as an ARC-27 radio transmitter and receiver. The beacon locator system involves the ARC-27 receiver, an electronic switch, and a control unit including a directional indicator.

FIGURES 2A and 2B are circuit diagrams which, taken together, show the connection of equipment mounted and carried on board the airplane 28. These two figures form a single complete figure when placed side by side such that the ends of the broken leads between figures are matched. The pair of whip antennas 30 are shown enlarged in FIGURE 2A and are preferably mounted to the underside of the fuselage of the airplane 28 is indicated in a view looking aft. The left and right (with respect to such sides of the airplane 28) antennas 30a and 30b extend vertically downwards when the airplane 28 is in normal flight attitude, and are symmetrically separated a quarter wavelength apart on a line perpendicular to the longitudinal axis of the airplane 28 as mentioned previously. The antennas 30a and 30b must be directly across from and parallel to each other, and are each a quarter wavelength long, effectively, for the operating frequency of the transmitter 24. At 243 mc.p.s., for example, the antennas are separated 12 inches apart, and each antenna can comprise a .125 inch diameter stainless steel spring wire which is 11.5 inches long. Antenna base structure accounts for a small additional part of the effective electrical length of the antennas 30a and 30b.

The antennas 30a and 30b are respectively mounted to antenna bases 32a and 32b. Coaxial cables 34a and 34b connect to respective antennas 30a and 30b to an electronic (solid state) antenna switch 36. The cables 34a and 34b are each effectively a half wavelength long to present to their corresponding antennas the electrical connection produced within the switch 36, at any instant. Thus, if the switch 36 effectively produces a ground connection for the cable 34b, this ground connection is effectively presented to the right antenna 30b such that it becomes a ground reflector for the left antenna 30a. This ground connection is alternately provided to the antennas 30a and 30b so that one acts as a director for the other which is being sampled according to the condition of the switch 36. The pattern resulting from the arrangement of antennas 30a and 30b in combined operation produces a directional axis which is parallel to the longitudinal axis of the airplane 28.

The electronic antenna switch 36 comprises two symmetrical channels or sections connected to respective antennas. The left antenna 30a is connected through cable 34a to a capacitor C35 which is, in turn, connected to another capacitor C33, a diode D13 and radio frequency choke L15. The choke L15 is connected to resistor R33 through a feedthrough capacitor C43 which is provided in the shielding wall 36a of the switch 36. The choke L15 is connected to lead f by the series resistor R33. As can be seen in FIGURE 2A, choke L14 is similarly connected in series with the capacitor C33 to lead g through feedthrough capacitor C42. The diode D13 is also connected in series with the capacitor C35 to the common junction between choke L14 and the feedthrough capacitor C42.

Capacitor C32 is connected to the capacitor C33 by diode D12 which passes through a small hole provided in the shielding wall 36b. The common junction between diode D12 and capacitor C32 is connected to choke L13. The choke L13 is connected to lead f by a series resistor R32 which connects with the choke L13 through feedthrough capacitor C41. Capacitor C36 connects the capacitor C32 to the base of amplifier transistor Q10. The base of the transistor Q10 is connected by resistor R34 to wall 36c and grounded thereby.

The emitter of the transistor Q10 is connected to lead e by series resistor R35 through a feedthrough capacitor C39 provided in wall 36a. The emitter of the transistor Q10 is also connected to grounded wall 36c by capacitor C44, and the collector is connected to cable 38 by a network including series tuning capacitor C46, and shunt choke L16 and impedance matching capacitor C45. An output signal is provided on cable 38 which is connected to the antenna connector of the receiver portion of the ARC-27 transmitter and receiver 40.

The right antenna 30b is connected by cable 34b to a channel or section of antenna switch 36 which is similar to that for the left antenna 30a. Capacitors C30, C31, C34, C37, C38 and C40 correspond respectively to capacitors C33, C32, C35, C43, C42 and C41. Chokes L10, L11 and L12 correspond to chokes L15, L14 and L13, respectively. Similarly, diodes D10 and D11 correspond to diodes D13 and D12, respectively. Finally, the resistors R30 and R31 correspond respectively to resistors R33 and R32. The indicated walls provided within the switch 36 are necessary to prevent cross coupling between circuits within the switch for the two antennas 30a and 30b.

The ARC-27 unit 40 is substantially conventional but has been modified generally as indicated by the solid line matter shown within block 40 in FIGURE 2A. A control relay 42 has been added for controlling normal communication operation of the unit 40 and beacon location or search operation thereof. The lead a is connected to +28 volts through the control coil 42a of the relay 42 as shown. The pole 42b is also connected to +28 volts, and this pole 42b normally engages the right contact which is connected to the bias relay unit 44. The connecting line 46 is effectively the ARC-27 transmitter keying line for the ARC-27 unit, and this keying line is broken when relay 42 is energized. The lead b is connected to ground in the unit 40.

Lead c is connected to the intermediate frequency stage of the ARC-27 unit's RF, IF and audio stages 48 of the unit 40, through a filter including series choke 50 and shunt capacitor 52, rectifier diode 54 and coupling capacitor 56. The stages are, of course, conventional and not shown in detail here. The IF signal is thus rectified and filtered to provide an output signal on lead c. Relay pole 42c is connected to meter panel 58 which is effectively a ground connection. As can be seen in FIGURE 2A, the pole 42c normally engages its right contact which is connected to the squelch circuit in stages 48. The squelch circuit is disabled by removing the ground meter panel 58 connection when the relay 42 is energized. Thus, the squelch circuit is rendered inoperative during beacon location operation so that background noises including any low level signals which are picked up are not squelched. Modulator 60 of the ARC-27 transmitter is also disabled during beacon location operation.

Relay pole 42d is connected to lead d which is the gain control line. An adjustably variable negative voltage of, for example, 0 to −7 volts can be provided on lead d. When relay 42 is energized for beacon location operation, the pole 42d connects lead d to the automatic volume control circuit AVC in the stages 48. This negative voltage overrides and controls the sensitivity of the ARC-27 receiver. Maximum sensitivity is obtained at 0 volts and minimum sensitivity at −7 volts, for example. This provides a sensitivity adjustment for the indicator unit of the system.

Relay pole 42e is connected to the usual input of the stages 48 and, in normal position, engages its right contact which is connected to the normal communication antenna of the ARC-27 unit 40. When the relay 42 is energized for beacon location operation, the pole 42e, and hence the input to the stages 48, engages its left contact which is connected to cable 38 and thus alternately to the antennas 30a and 30b by operation of the antenna switch 36.

A rectified and filtered signal is provided of lead c, and is representative of the magnitude of the signal received by the antennas 30a and 30b which are alternately sampled through operation of the switch 36. The lead c is connected to relay pole 62a of a relay 62 located in the control unit 64, as shown in FIGURE 2B. A control switch 66 is located in the unit 64, and is a double pole switch as illustrated. The upper pole 66a is connected to +28 volts through a diode D1 which is connected to lead 68 and the +28 volts. The lower pole 66b is connected to lead a, and the lead b is connected to the contact for the pole 66b. The lead b is connected to −28 volts through lead 70 which is also connected to the ship's ground. The contact for pole 66a is connected to one end of resistor R12 and to one end of the control coil 62b of the relay 62.

The other end of resistor R12 is connected to lead e and to a series resistor R25. Zener diode D2 is connected between the common junction of resistors R12 and R25 to lead b or ground, and another zener diode D6 is connected to the other end of resistor R25 and ground lead b. For normal communications operation of the ARC–27 unit 40 (FIGURE 2A), the switch 66 is left open as shown in FIGURE 2B. However, for beacon location or search operation, the switch 66 is closed. Power is then provided on lead e and lead 72 which are connected respectively to the cathodes of the diodes D2 and D6. A ground connection also is then provided on lead a so that relay coil 42a (FIGURE 2A) is energized and the relay 42 actuated.

A double pole, double throw switch 74 (FIGURE 2B) is provided for selecting a mode of search operation in utilizing either the RF (more rigorously, the IF, or shifted frequency level RF) or audio frequencies of the output signal from the ARC–27 receiver, and which appears on lead c, for establishing directional indication by the control unit 64. Switch pole 74a is connected to ground as indicated in FIGURE 2B, and the other lower end of the relay coil 62b is connected to the RF mode position contact for pole 74a. The other pole 74b of mode switch 74 is connected to the lower end of a directional indicator M1 which is, for example, a 50–0–50 microampere meter connected in a bridge circuit 76 as illustrated. The contact associated with the pole 74b for the audio mode is connected to the other end of the meter M1 through a large (1000 mfd., for example) capacitor C4. A smaller (40 mfd., for example) capacitor C13 is connected across the meter M1 as shown. These capacitors C4 and C13 damp and eliminate fluctuations of the meter's needle.

The upper contact of relay pole 62a is connected to the base of amplifier transistor Q5 through a bandpass filter 78 including resistor R26, capacitor C12, choke L2 and shunt capacitors C11 and C10. The carrier of the beacon transmitter 24 is modulated by a tone signal which is varied from 300 to 1000 c.p.s. 2.5 times a second. The bandpass filter 78 is designed to pass the audio (modulation) frequencies of approximately 300 to 1000 c.p.s. on the 243 mc.p.s. carrier, or on the shifted frequency IF level carrier. The amplified signal from transistor Q5 is coupled from the collector of transistor Q5 through capacitor C7 and rectified by diode D4, and then connected to the upper contact of relay pole 62c by inductor L1. The collector of transistor Q5 is connected to the supply lead 72 by resistor R18. The collector of transistor Q5 is also connected to its base through series connected resistors R19 and R20 to bias the base. Capacitor C9 is connected between the common junction of the resistors R19 and R20 to ground.

The relay pole 62c is connected to the base of amplifier transistor Q4 through series capacitor C5, and is also connected to the lower contact of relay pole 62a. An input resistor R22 is connected from relay pole 62c to ground, and the transistor Q4 is connected in an amplifier circuit similar to that of transistor Q5. It can be seen that when switch 66 is placed in search position, relay coil 62b will not be energized if the switch 74 is in the audio mode position. When relay 62 is not energized, the signal on lead c is passed through the bandpass filter 78 and amplified by transistor Q5. The amplified audio signal is rectified and provided to transistor Q4. However, if the switch 74 is in the RF mode position, the relay 62 is energized so that the signal on lead c is not passed through the bandpass filter 78 and transistor Q5 but is applied directly to the transistor Q4 through capacitor C5.

Unijunction transistor Q1 is connected in a sawtooth generator circuit including capacitor C1 which is connected between the emitter of transistor Q1 and the base of transistor Q2. Generator frequency is 33 c.p.s., for example. The output of transistor Q2 is connected to lead g and applied to the base of transistor Q3 through series connected capacitor C2 and resistor R5. Resistor R6 connects the base of transistor Q3 to the cathode of zener diode D3 which connects lead f to ground. The cathode of diode D3 is connected to the left end of the bridge circuit 76, the right end of which is connected to ground. The diode D3 maintains lead f at a voltage of 5.2 volts, for example.

The collectors of the transistors Q3 and Q4 are connected together by a capacitor C3, and the collector of transistor Q3 is connected to the upper end of the meter M1 through resistor R8. The circuit including transistors Q3 and Q4, and the capacitor C3 is a comparator 80 wherein the output is applied to the bridge circuit 76. The bridge circuit 76 includes two parallel branches wherein series connected resistors R14 and R15 comprise two arms of one branch, and series connected resistors R16 and R17 comprise the two arms of the other branch. The ends of the bridge circuit 76 are fixed in potential by the zener diode D3 connected across the ends, and the output of the comparator 80 is applied to the bridge to control current flow, and the direction of such flow, through the meter M1.

Transistor Q6 is connected in an oscillator circuit 82 which includes a transformer T1, and capacitor C14 and resistor R23. Feedback is from collector to base and the necessary phase shift is obtained through the transformer and applied to the base by means of capacitor C14 and resistor R23. The collector of transistor Q6 is connected to ground through the primary winding of transformer T1 and feedback to the base is obtained from the secondary winding and applied to the base through capacitor C14. The resistor R23 is connected between the collector and base of the transistor Q6. The frequency of oscillation is, for example, 700 c.p.s. The oscillator 82 is necessary to produce a negative control voltage in the airplane 28 which, as in many such craft, does not have a negative voltage available.

The output of the oscillator 82 is rectified by diode D5 and filtered by a capacitor C8 which is connected in series with diode D5 so that the series combination is connected across the secondary winding of transformer T1. Resistor R21 and series connected potentiometer R24 are connected across the capacitor C8 and the tap or wiper of potentiometer R24 is connected to lead d, as shown. The orientation of the diode D5 is such that a negative voltage is obtained on lead d and which is adjustable by variation of the wiper of the potentiometer R24. This is the gain control signal which is applied to the AVC circuit (FIGURE 2A) in stages 48 when the relay 42 is energized as during search or beacon location operation.

FIGURE 3 is a chart of waveforms generally representing those that would appear at the points in FIGURE 2B indicated by the circled capital letters which correspond to the capital letters identifying the columns in the chart of FIGURE 3. The numerical voltage values indicated on the waveforms are merely illustrative, and are not to be construed as limiting on the invention in any way.

Specific description of the operation of the system is now made with simultaneous reference to both FIGURES 2A and 2B. When the switch 66 (FIGURE 2B) is closed for search operation, power is applied to the various components of the control unit 64. The oscillator 82 is energized to produce a negative control voltage which is available on lead d, and the unijunction generator circuit including capacitor C1 is also energized.

In the zero signal row of FIGURE 3, a sawtooth waveform 84 which appears at the point A in FIGURE 2B is shown. The corresponding waveform 86 which is produced on the base of transistor Q2 (point B) shows that when transistor Q1 conducts, the capacitor C1 discharges through it and the point B rises in potential. When the transistor Q1 stops conducting, the potential at point B is at a level which permits the transistor Q2 to conduct and the capacitor C1 is charged through resistor R1 and the conducting transistor Q2. When the potential at point A reaches a value which causes the transistor Q1 to conduct, the capacitor C1 discharges through it and the transistor Q2 is cut off to repeat the cycle. A square wave 88 is produced at point C and this square wave appears on the lead g. The central reference level of the square wave 88 is at 5.2 volts, for example.

The square wave 90 is produced at point D and has a smaller swing because of the level set by the zener diode D3 which is connected to point D through the resistor R6. The 5.2 volts level established by diode D3 is also produced on the lead f. This level of 5.2 volts is connected by lead f to the resistors R30 and R33 of the antenna switch 36 shown in FIGURE 2A. As can be seen in this figure, the lead g applies the square wave 88 to the diodes D10 and D13.

When the lead g is positive relative to lead f, the diode D13 is rendered non-conducting and the RF signal from the left antenna 30a is provided through capacitors C35 and C33, conducting diode D12, and capacitors C32 and C36 to the base of the amplifier transistor Q10. The chokes in switch 36, of course, block the RF signal from leads including these chokes but allow low frequency and D.C. signals to pass through such leads. The relatively positive signal on diode D10 permits it to conduct because of its orientation, and as applied to diode D11 does not permit this diode D11 to conduct, because of its orientation. The RF signal from the right antenna 30b thus passes through the diode D10 but is grounded by the capacitor C38. A ground is therefore presented to cable 34b and, since this is a half wavelength cable, the right antenna 30b is effectively grounded and serves as a ground reflector for the left antenna 30a.

When the lead g is negative relative to lead f, conditions are reversed so that the RF signal from the right antenna 30b is fed to the amplifier transistor Q10 and the left antenna 30a is grounded by switch 36 to serve as a ground reflector to the right antenna 30b. Accordingly, the antennas 30a and 30b are alternately sampled at the frequency of the square wave 88 shown in FIGURE 3. The amplified antenna signals are, of course, provided to the cable 38 (FIGURE 2A) which is connected to the ARC–27 unit 40.

When switch 66 (FIGURE 2B) was closed, a ground was connected to lead a by the switch pole 66b. This connects the relay coil 42a of the relay 42 (shown in FIGURE 2A) to ground so that the coil 42a is energized to actuate the relay 42. This disables the squelch circuit in stages 48, connects the negative gain control voltage on lead d to the AVC circuit, and connects cable 38 to the input of the stages 48. Thus, the IF signals from the stages 48 due to the sampled antenna signals are detected and obtained on lead c.

With the mode switch 74 in the audio position as shown in FIGURE 2B, the IF signals on lead c are fed to the bandpass filter 78 through the upper contact of relay pole 62a. It can be seen that the difference produced when the switch 74 is placed in the RF position, is that the relay 62 is actuated so that the signals on lead c are applied directly to transistor Q4. Also, the larger capacitor C4 is removed from across the meter M1. The bandpass filter 78 passes the modulation on the carrier and the modulation or audio signals are amplified by transistor Q5, rectified by diode D4 and applied to transistor Q4.

With zero signal, the waveform 92 shown in FIGURE 3 appears at point I, waveform 94 appears at point H, and waveform 96 appears at point G. As a result of the signals at points D and G, the waveforms 98 and 100 are respectively produced at points E and F. By properly setting resistor R15, a centered zero reading is produced and maintained on meter M1. For a signal on the left antenna 30a only, the waveforms shown in the second row of FIGURE 3 are obtained and the needle of meter M1 is responsively deflected to give a left indication. With the mode switch 74 placed in the RF position, the third row shows exemplificative waveforms resulting from a signal to only the left antenna 30a. The fourth row shows such waveforms resulting from a signal to only the right antenna 30b.

With zero signal or equal magnitude signals from both left and right antennas 30a and 30b, the potential at point F tends to remain constant. The point E, of course, alternates from low to high potentials by the switching action of Q3. The average potential applied to the bridge circuit 76 through resistor R8 is held at such a reference level which does not cause any unbalance of the bridge. That is, during the half cycle that transistor Q3 conducts, the capacitor C3 is being charged to a previous condition, and on the next half cycle when transistor Q3 is non-conducting, the higher voltage then appearing at point E is held down by the charge on capacitor C3. The net average effect is that the potential of point E is kept at a constant reference level which maintains a balanced bridge 76.

If the signal on the left antenna 30a is greater than that on the right antenna 30b due to incorrect orientation of the airplane 28, the potential at point F is less than that for zero or equal antenna signals when the transistor Q3 conducts during its half cycle, and is greater when the transistor Q3 is non-conducting on the next half cycle. The capacitor C3 is charged less than before (i.e., during the condition with zero or equal antenna signals) when the transistor Q3 conducts on its half cycle, so that during the next half cycle, together with the higher potential at point F due to the signal of the then sampled right antenna, the capacitor C3 produces a higher than reference average voltage or level at point E which unbalances the bridge circuit 76, and current flows down through the meter M1 to deflect the needle in one direction. It should be clear that the deflection is also greater for greater differences of signal strengths on the left and right antennas 30a and 30b.

Now, if the signal on the left antenna 30a is less than that on the right antenna 30b because of aircraft orientation, the potential at point F is greater than that for zero or equal antenna signals when the transistor Q3 conducts on its half cycle, and is less when the transistor Q3 is non-conducting on the next half cycle. The capacitor C3 is charged greater than before (i.e., during the condition with zero or equal antenna signals) when the transistor Q3 conducts on its half cycle, so that during the next half cycle, together with the lower potential at point F due to the signal of the then sampled right antenna, the capacitor C3 produces a lower than reference average voltage or level at point E which unbalances the bridge circuit 76 and current flows up through the meter M1 to deflect the needle in another direction.

General operation of the system can now be described for the situation indicated in FIGURE 1. It is assumed that the transmitter 24 is operating and the antenna 20 on the inflated float 14 is radiating a tone modulated carrier signal. The ARC-27 radio receiver on the search airplane 28 is first turned on and the switch 66 (FIGURE 2B) in the control unit 64 is placed in its search or closed condition. Gain control is adjusted for maximum receiver sensitivity by adjusting potentiometer R24 to provide 0 volts on the lead d. The mode switch 74 is initially placed in the audio position as indicated in FIGURE 2B. System performance is greatly improved at maximum range under high noise conditions when homing on the modulation on the carrier. At closer range when the picked up signal becomes quite strong, it is more accurate to home on the beacon transmitter carrier (or shifted frequency level carrier) rather than the modulation. The undesirable jamming due to strong outside noise sources at maximum range is overcomed by homing on the modulation.

The volume control of the radio receiver is adjusted so that receiver background noise can be heard, and the airplane is climbed to as high an altitude as possible or until the beacon transmitter signal is picked up. Since line-of-sight frequencies are used for this equipment, the higher the aircraft, the greater will be the range. When the beacon signal is picked up, the pilot can then follow indications of the meter M1.

The meter M1 is a center zero meter which is used for a left/right indicator. The needle of the meter can be centered with no signal being received by adjusting the zero adjustment resistor R15 in the bridge circuit 76 (FIGURE 2B). When the indicator needle swings to the left of scale center, the beacon signal source is correctly to the left of the airplane heading and vice versa. When the signal source is directly on the airplane heading, the indicator needle will be directly centered on the scale zero.

In a situation where the pilot could conceivably establish a reciprocal course of flying directly away from the beacon, a turn of the airplane in the direction of indicator swing increases the off center swing, until the turn is continued sufficiently to start decreasing the off center swing to bring the aircraft into proper heading when the needle returns to zero. The radio receiver's normal volume control can ke kept adjusted during search for comfortable listening. The purpose of listening to the characteristic modulation (varying) tone is to make sure that the distinctive signal of the beacon transmitter is being followed. At the same time, the gain control (potentiometer R24 in FIGURE 2B) should be readjusted as often as required to keep a good swing of the indicator pointer when the airplane is slightly off course. The airplane can be deliberately swung off course occasionally to check this. More frequent adjustment of the gain control is required as the beacon transmitter is approached.

When the signal becomes fairly strong, descent of the airplane can be started but care should be taken not to get below the horizon with respect to the beacon transmitter. Greatest accuracy is obtained when the final approach is made as low as the surrounding terrain or surface will permit. As the airplane flies directly over the beacon transmitter, the indicator pointer will suddenly swing from side to side several times. After the search is completed, the switch 66 can be placed back in the communication or open position of the switch to restore normal communications facilities (ARC-27 unit 40) of the airplane, and to turn off the beacon locator system.

While only one embodiment of the invention is described above and shown in the drawings, it is to be understood that this particular embodiment is merely illustrative of, and not restrictive on, the broad invention and that various changes in design, structure and arrangement may be made without departing from the spirit and scope of the appended claims.

We claim:

1. A beacon locator system, comprising:
    antenna means including first and second antenna elements in spaced relationship to each other;
    an antenna switch for alternately sampling said first and second elements;
    amplifier means, said switch alternately connecting said first and second elements to said amplifier means for alternately amplifying respective signals of said first and second elements; and
    comparator means for comparing relative signal strengths of said first and second elements and including
        an electronic switch adapted to be operated open and closed in synchronism with the alternate sampling of said elements,
        an electronic amplifier adapted to receive the amplified signals of said amplifier means, and
        a capacitor connecting output electrodes of said electronic switch and electronic amplifier together, an output connection being obtained from the output electrode of said electronic switch connected to said capacitor whereby an output signal of one condition is provided from said output connection when signal strength of said first element is greater than that of said second element and of another condition when signal strength of said first element is less than that of said second element.

2. A beacon locator system, comprising:
    antenna means including first and second antenna elements in spaced relationship to each other;
    an antenna switch for alternately sampling said first and second elements;
    amplifying stages, said switch alternately connecting said first and second elements to said stages for alternately amplifying respective signals of said first and second elements;
    comparator means connecting with said stages for comparing relative signal strengths of said first and second elements, said comparator means including
        an electronic switch adapted to be operated open and closed in synchronism with the alternate sampling of said elements,
        an electronic amplifier adapted to receive the amplified signals of said amplifying stages, and
        a capacitor connecting output electrodes of said electronic switch and electronic amplifier together, an output connection being obtained from the electrode of said electronic switch connected to said capacitor for providing an output signal of one condition when signal strength of said first element is greater than that of said second element and of another condition when signal strength of said first element is less than that of said second element; and
    indicator means responsive to the output signal of said comparator means for giving an indication in one direction from a null position for one condition of the output signal of said comparator means and in another direction from the null position for another condition of the output signal of said comparator means.

3. A beacon locator system as defined in claim 1 in which said antenna means includes first and second whip antenna elements spaced a quarter wavelength apart parallel to each other, and said antenna switch alternately samples one of said elements while effectively grounding the other.

4. A beacon locator system as defined in claim 1 including filter means connecting said amplifier means to said comparator means, for passing predetermined signal frequencies to said comparator means.

5. A beacon locator system as defined in claim 1 wherein said amplifier means are part of a radio receiver which includes an automatic volume control circuit, and said beacon locator system includes means for generating a negative control voltage from a positive voltage, said negative control voltage being adapted to be applied to said automatic volume control circuit for variably overriding operation of the same whereby sensitivity of said receiver can be controlled.

6. A beacon locator system as defined in claim 1 including a synchronizing signal generator for providing a synchronizing signal to operate said antenna switch and said electronic switch of said comparator in synchronism.

7. A beacon locator system as defined in claim 2 in which said antenna means includes first and second whip antenna elements spaced a quarter wavelength apart parallel to each other, and said antenna switch alternately samples one of said elements while effectively grounding the other.

8. A beacon locator system as defined in claim 2 including a bandpass filter connecting said amplifying stages to said comparator means, for passing predetermined signal frequencies to said comparator means.

9. A beacon locator system as defined in claim 2 including a square wave generator for providing a synchronizing signal to operate said antenna switch and said electronic switch of said comparator in synchronism.

10. A beacon locator system as defined in claim 9 in which said antenna switch includes first and second channels adapted to be connected respectively to said first and second antenna elements, each channel comprising a first unidirectional conducting device adapted to connect a corresponding channel antenna element to an output line connecting with said stages, a second unidirectional conducting device adapted to connect said corresponding channel antenna element to ground, and means for controlling conduction of said devices whereby one of said devices is rendered conducting when the other is rendered nonconducting.

11. A beacon locator system as defined in claim 2 wherein said amplifying stages are part of a radio receiver which includes an automatic volume control circuit, a squelch circuit, and means for disabling said squelch circuit during beacon location operation.

12. A beacon locator system as defined in claim 11 including oscillator means, and rectifier means connected to said oscillator means for providing a negative control voltage therefrom, said negative control voltage being adapted to be applied to said automatic volume control circuit for variably overriding operation of the same whereby sensitivity of said receiver can be controlled.

13. In a beacon locator system, comparator means comprising;
a transistor switch having an output electrode and adapted to be operated at a predetermined frequency to produce first and second reference potentials at said switch output electrode;
a transistor amplifier having an output electrode and adapted to have first and second input signals alternately applied thereto at the predetermined switch operation frequency to produce first and second output signals at said amplifier output electrode; and
capacitor means connecting output electrodes of said switch and amplifier together, an output connection being obtained from the electrode of said switch connected to said capacitor means whereby potential of said output connection is varied according to average charge condition established on said capacitor means by relative magnitudes of said first and second output signals at said amplifier output electrode alternately acting through said capacitor means respectively with said first and second reference potentials at said switch output electrode.

14. A beacon locator system, comprising:
antenna means including first and second antenna elements in spaced relationship to each other;
an antenna switch for alternately sampling said first and second elements;
amplifying stages, said antenna switch alternately connecting said first and second elements to said stages for alternately amplifying respective signals of said first and second elements;
comparator means including an electronic switch, an electronic amplifier, and a capacitor connecting output electrodes of said electronic switch and electronic amplifier together, an output connection being obtained from the electrode of said electronic switch connected to said capacitor for providing an output signal;
a synchronizing signal generator for providing a synchronizing signal to operate said antenna switch and said electronic switch of said comparator in synchronism;
means for connecting said amplifying stages to said electronic amplifier of said comparator, said connecting means normally connecting said stages directly to said electronic amplifier of said comparator and selectively alterable to connect said stages to said electronic amplifier of said comparator through filter means for passing predetermined signal frequencies; and
indicator means responsive to the output signal of said comparator means for giving an indication in one direction from a null position for one condition of the output signal of said comparator means, and in another direction from the null position for another condition of the output signal of said comparator means.

15. Comparator means as defined in claim 13 including, in addition, a Wheatstone bridge circuit having a substantially fixed voltage applied between ends of said bridge circuit and a meter connected between centers of said bridge circuit, said output connection being adapted to be connected to one of the centers of said bridge circuit whereby said meter is actuated in accordance with the potential of said output connection.

References Cited in the file of this patent
UNITED STATES PATENTS

| | | |
|---|---|---|
| 2,234,331 | Bond | Mar. 11, 1941 |
| 2,266,038 | Hinman | Dec. 6, 1941 |
| 2,962,715 | Byatt | Nov. 29, 1960 |
| 2,997,710 | Cotuno | Aug. 22, 1961 |